United States Patent [19]

Wheatcroft

[11] Patent Number: 5,018,262

[45] Date of Patent: May 28, 1991

[54] BELT SPLICING APPARATUS

[76] Inventor: Royce Wheatcroft, 333 E. Vine, Dighton, Kans. 67839

[21] Appl. No.: 415,865

[22] Filed: Oct. 2, 1989

[51] Int. Cl.⁵ ............................................. B23P 11/00
[52] U.S. Cl. .................................................. 29/243.51
[58] Field of Search ...................... 29/251, 252, 243.5, 29/243.56, 243.58, 243.51, 432, 716, 798, 787; 227/5-7, 95

[56] References Cited

U.S. PATENT DOCUMENTS

| | | |
|---|---|---|
| 1,526,967 | 2/1925 | Diamond . |
| 1,544,561 | 7/1925 | Diamond . |
| 2,162,787 | 6/1939 | Olsen . |
| 3,044,074 | 7/1962 | Tebb et al. . |
| 3,283,699 | 11/1966 | Hawkins ................................ 29/251 |
| 3,562,892 | 2/1971 | Laneri . |
| 3,581,350 | 6/1971 | McComb . |
| 3,686,738 | 8/1972 | Thomson . |
| 4,003,305 | 1/1977 | King ...................................... 29/251 |
| 4,224,731 | 9/1980 | Lingle ............................... 29/243.56 |
| 4,283,825 | 8/1981 | McKay et al. ........................ 29/251 |
| 4,517,737 | 5/1985 | Sulzle . |
| 4,670,958 | 6/1987 | Hoffgen .............................. 29/252 |
| 4,773,141 | 9/1988 | Seredich ............................. 29/251 |

Primary Examiner—Robert C. Watson
Attorney, Agent, or Firm—John Wade Carpenter

[57] ABSTRACT

An apparatus for lacing together ends of a belt. The apparatus contains a base, a pair of frame structures secured to the base and connecting together at the respective tops thereof. The pair of frame structures slope downwardly from their respective connected tops and away from each other such as to provide a generally upright opening wherein a lever is slidably disposed for moving up and down. A pair of springs connect to the pair of frames and to the lever for biasing upwardly the lever. An hydraulic jack is preferably provided for driving downwardly the lever towards the base to contact and close a clipper vise lacer containing a plurality of clipper hooks. Upon closure, the clipper vise lacer drives and embeds the clipper hooks into an end of the belt that has been previously disposed in the clipper vise lacer.

11 Claims, 7 Drawing Sheets

BELT SPLICING APPARATUS

FIELD OF THE INVENTION

This invention relates to an apparatus for belt splicing. More particularly, the present invention provides an apparatus for lacing ends of a belt, such as conveyor belts, belts for bailing hay, etc.

DESCRIPTION OF THE PRIOR ART

A patentability investigation was conducted and the following United States patents were discovered: U.S Pat. No. 1,526,967 to Diamond; U.S. Pat. No. 1,544,561 to Diamond; No. U.S. Pat. No. 2,162,787 to Olsen; U.S. Pat. No. 3,044,074 to Tebb et al.; U.S. Pat. No. 3,562,892 to Laneri; U.S. Pat. No. 3,581,350 to Mc-Comb; U.S. Pat. No. 3,686,738 to Thompson; U.S. Pat. No. 4,517,737 to Sulzle. The foregoing prior art patents do not suggest or teach the particular belt lacing apparatus of this invention.

SUMMARY OF THE INVENTION

The present invention accomplishes its desired objects by providing an apparatus for lacing together the ends of a belt. The apparatus has a base means for supporting the apparatus on a level surface such that the apparatus is in an upright position. A first frame structure and a second frame structure are provided and are secured to the base. Each of the frame structures has a top whereat the first and second frame structures connect together to slope down and away from each other such as to provide a generally upright opening. A lever means is slidably disposed in the upright opening for moving up and down. The lever means is biased upwardly by a pair of spring means secured to opposed ends thereof. A pair of lever support means is secured to the first and second frame structure for providing a barrier whereagainst the lever means is lodged urgedly by the pair of spring means. The apparatus additionally includes a means for driving the lever means downwardly towards the base means to contact and close a CLIPPER ® vise lacer means (or any other vise lacer means) containing a plurality of hooks (eg CLIPPER ® hooks) such that the hooks are driven and embedded into an end of a belt that has been previously disposed in the vise lacer means.

The base means comprises a vise support member that is positioned underneath the lever means and is aligned with the upright opening. A pair of press stop means is additionally provided in the base. The pair of press stop means connects to a level top surface on opposed ends of the vise support member and functions to stop the downward travel of the lever means when the same is being driven downwardly by the means for driving the lever means. A pair of connector members straddle the upright opening and is secured to the first and second frame structures. The pair of spring means respectively secures to the pair of connector members and to the lever means. A support plate means is provided and is secured to the lever means in order to support the means for driving the lever means downwardly. The support plate means has a structure defining a pair of apertures wherethrough the pair of spring means is coupled to the lever means.

It is therefore an object of the present invention to provide a belt splicing apparatus.

These, together with the various ancillary objects and features which will become apparent to those skilled in the art as the following description proceeds, are attained by this novel belt splicing apparatus, a preferred embodiment being shown with reference to the accompanying drawings, by way of example only, wherein:

BRIEF DESCRIPTION OF THE DRAWINGS

FIG. 18 is a sectional view taken in direction of the arrows and along the plane of line 18—18 in FIG. 2a;

FIG. 21 is a vertical sectional view taken in direction of the arrows and along the plane of line 21—21 in FIG. 2a;

FIG. 22 is a perspective view of the container formed in the base;

FIG. 23 is a partial vertical sectional view disclosing a press stop positioned between the upright vertical opening in order to contact and stop the downward movement of the lever;

FIG. 24 is a partial front elevational view of the apparatus having closed the clipper vise lacer means in order to embed a plurality of clipper hooks into an end of a belt;

DETAILED DESCRIPTION OF THE INVENTION

Figure 26:
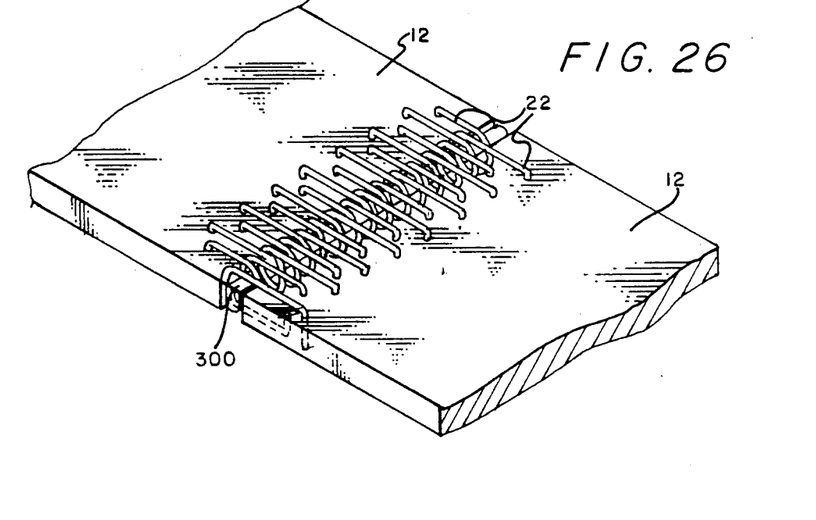
FIG. 26 is a perspective view of a pair of ends of a belt retained together by a retainer rod passing through the eyelets of closed, embedded clipper hooks.
Figures 27, 28:
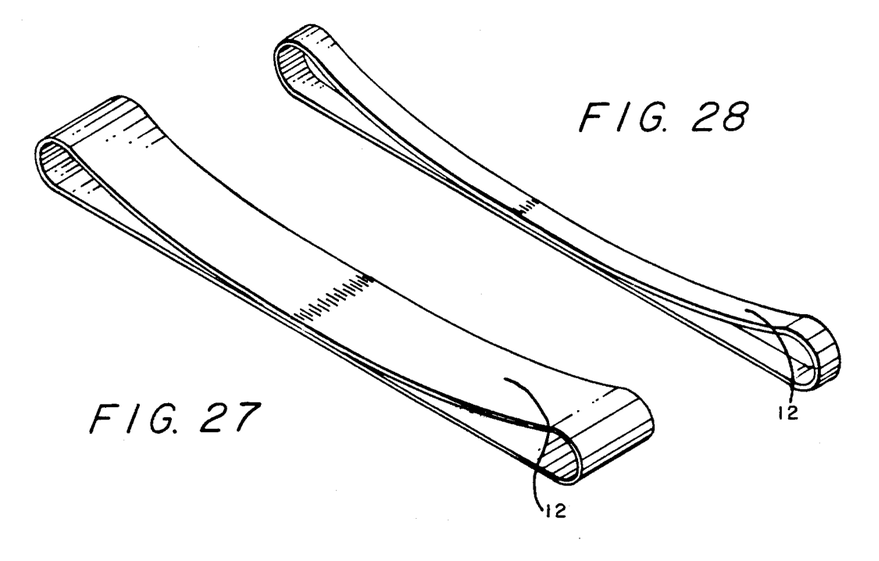
FIG. 27 is a perspective view of a belt laced together.
FIG. 28 is a perspective view of another type of belt laced together.

Referring in detail now to the drawings, wherein similar parts of the invention are identified by like reference numerals, there is seen the apparatus of this invention, generally illustrated as 10, which is for splicing, connecting, or otherwise attaching together the ends of belts 12 such as those for conveying, bailing hay, etc. (see FIGS. 25-28). The apparatus 10 comprises a base, generally illustrated as 14, consisting of a pair of angle irons 16—16 disposed generally parallel with respect to each other and having connected thereacross a base support member 18 which functions to provide support for a clipper vise lacer means, generally illustrated as 20, containing a plurality of clipper hooks 22 which are to be embedded into the ends of a belt 12 for securing together the same, as illustrated in FIG. 26. Base 14 also includes a container, generally illustrated as 24, having a front wall 26 and a rear wall 28, both of which secure to the angle irons 16—16 such that a structural portion of the angle irons 16—16 define the sides to the container 24. The container 24 also includes a floor 30 secured to the angle irons 16—16 and to the front and rear walls 26 and 28. A lid 32 pivotally connects to the rear wall 28.

The apparatus 10 also comprises a frame means, generally illustrated as 34, secured to and supported by the angle irons 16—16; a lever 36 slidably disposed within the frame means 34; a pair of spring means 38—38 secured to the frame means 34 for biasing the lever 36 upwardly and/or away from the base 14; and a means, generally illustrated as 40, for sending or drawing the lever 36 downwardly towards the base 14, more specifically towards the base support member 18, to contact and close the clipper vise lacer means 20 in order to drive and embed the clipper hooks 22 into an end of the belt 12 that had been previously disposed in the clipper vise lacer means 20.

Figures 1, 2:
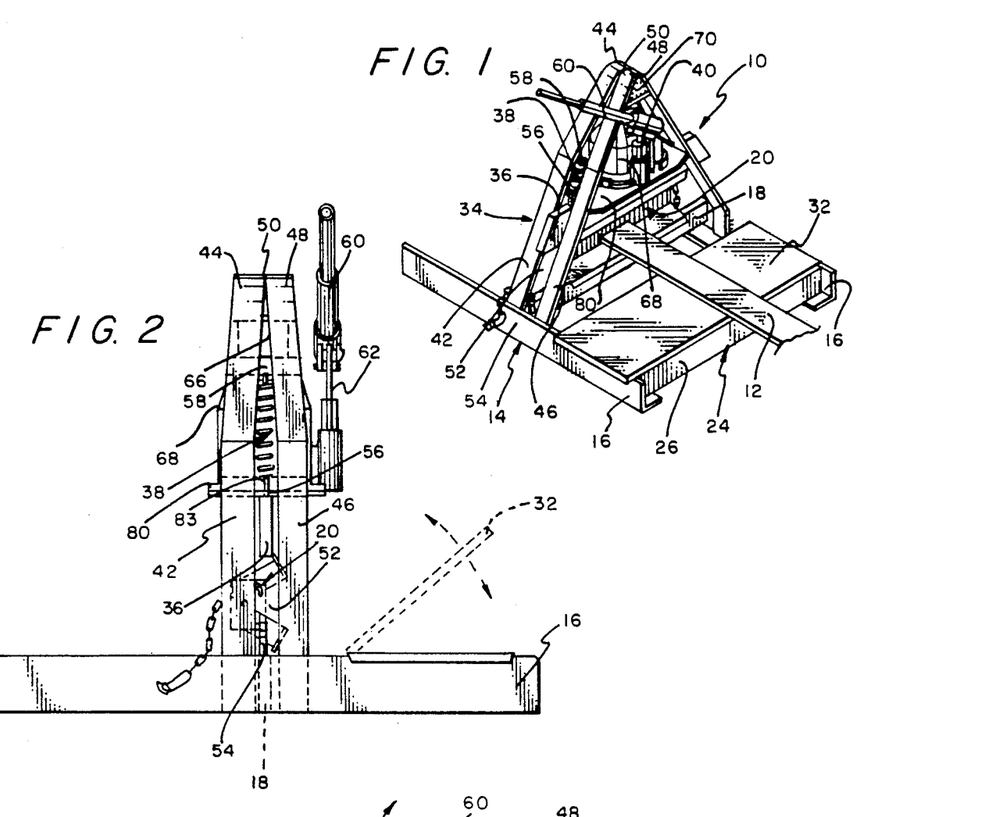
FIG. 1 is a perspective view of the belt splicing apparatus.
FIG. 2 is a side elevational view of the apparatus of FIG. 1.
Figure 2A:
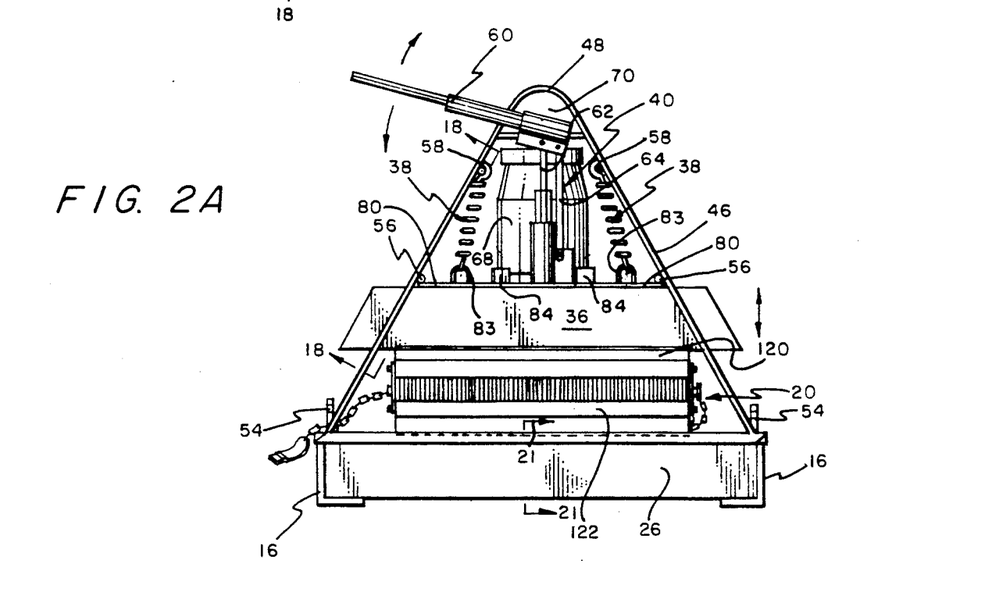
FIG. 2a is a front elevational view of the apparatus of FIG. 1.
Figure 4:
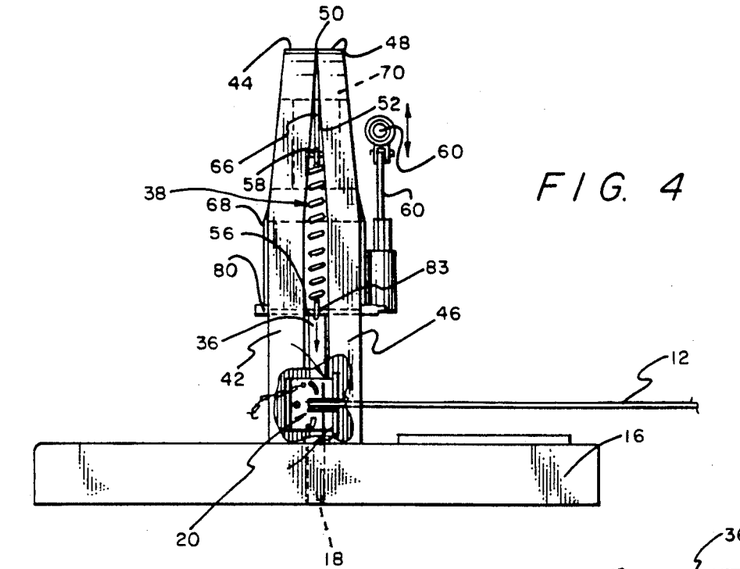
FIG. 4 is another side elevational view of the apparatus of FIG. 1.
Figure 5:
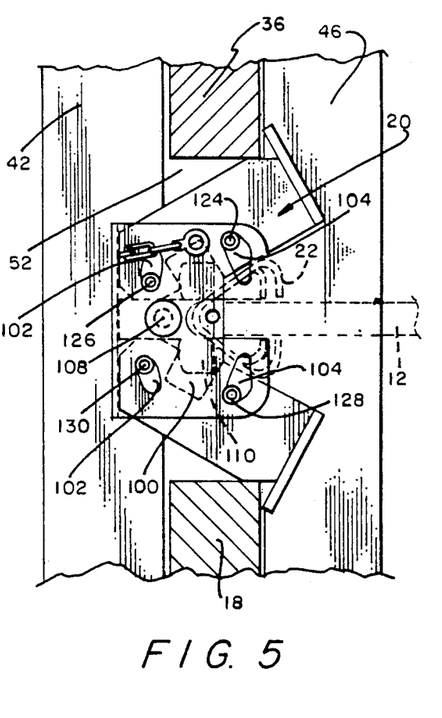
FIG. 5 is a partial vertical sectional view of the apparatus having positioned therein a clipper vise means disposed to be driven downwardly by the apparatus.
Figure 6:
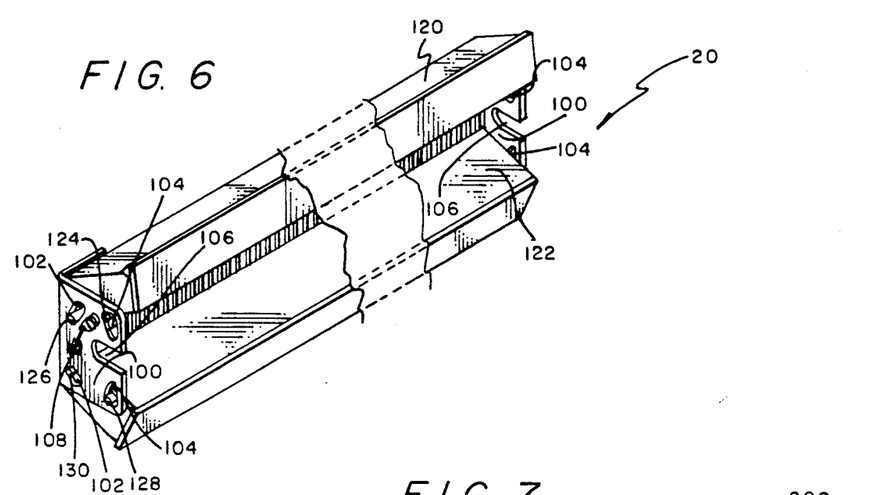
FIG. 6 is a perspective view of the clipper vise means.
Figure 7:
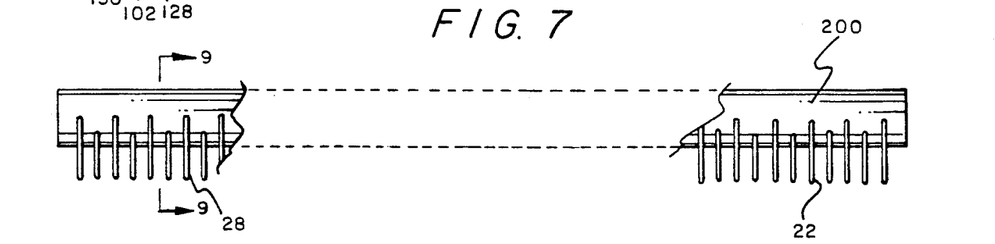
FIG. 7 is a partial top plan view of a plurality of hooks retained by a paper retainer.
Figure 8:
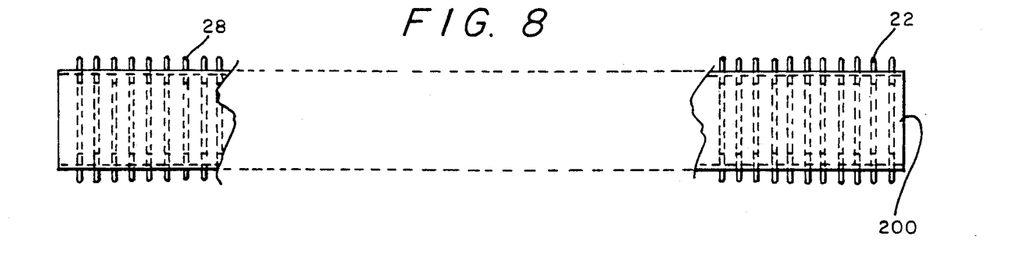
FIG. 8 is a front elevational view of the plurality of hooks of FIG. 7 including the paper retainer.
Figure 9:
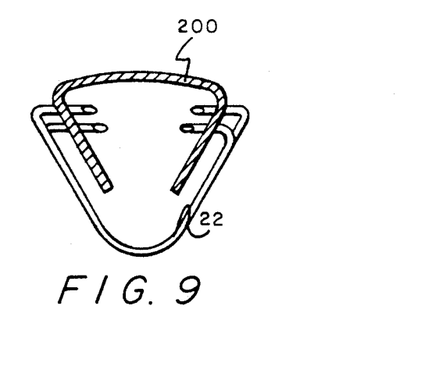
FIG. 9 is a vertical sectional view taken in direction of the arrows and along the plane of line 9—9 in FIG. 7.
Figure 10:
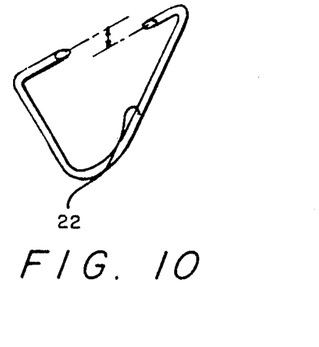
FIG. 10 is a perspective view of a clipper hook.
Figure 11:
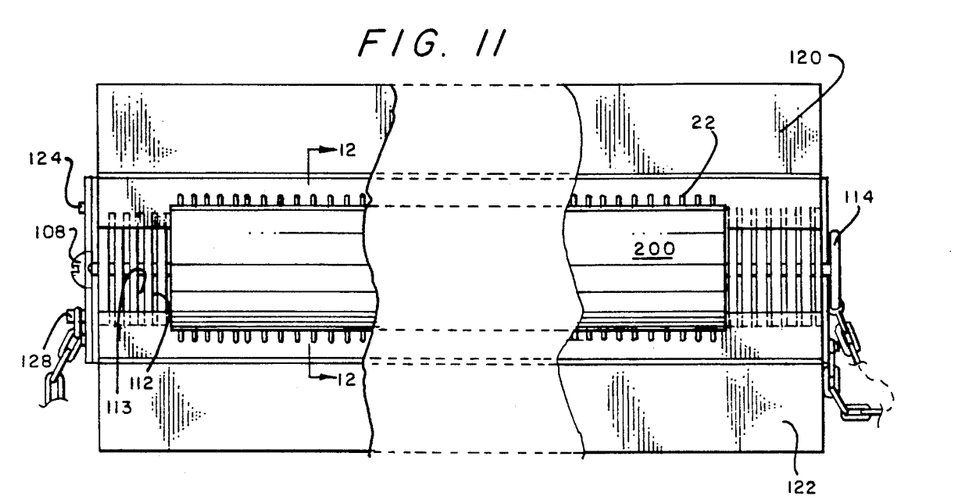
FIG. 11 is a front elevational view of the plurality of clipper hooks including the paper retainer of FIG. 7 disposed in the clipper lacer vise means of FIG. 6.
Figures 12, 13, 14:
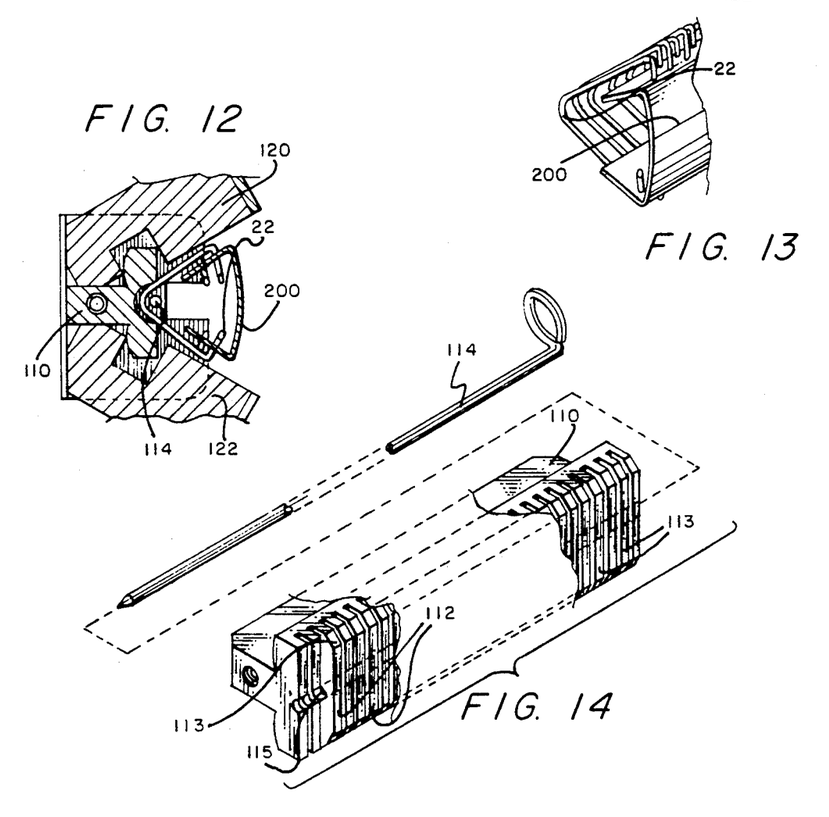
FIG. 12 is a vertical sectional view taken in direction of the arrows and along the plane of line 12—12 in FIG. 11.
FIG. 13 is a partial perspective view of an end of the plurality of clipper hooks including the paper retainer of FIG. 7.
FIG. 14 is a partial perspective view of a vise retainer having a retainer rod segmented therefrom.
Figure 15:
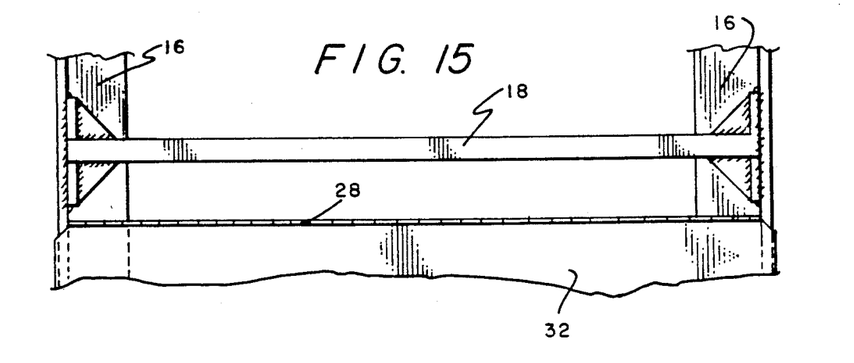
FIG. 15 is a partial top plan view disclosing the base support member which supports the clipper vise lacer means.

The frame means 34 preferably includes a first frame structure 42 having a top 44, and a second frame structure 46 having a top 48. The tops 44 and 48 of the respective frame structures 42 and 46 come together or join or are in close proximity to each other at 50 (see FIGS. 1, 2 and 4). After combining (or other coming together) at 50, the respective frame structures 42 and 46 extend away from each other to provide a slot or opening 52 wherethrough the lever 36 can travel up and down. The base support member 18 is secured to the angle irons 16—16 such as to be within the opening 52 and between the first and second frame structures 42 and 46, and such as further to be aligned with and over the lever 36. A pair of press stops 54—54 is bound to and on opposed ends of the base support member 18 in close proximity to the locations where the base support member connects to the angle irons 16—16. The press stops 54—54 extend upwardly and through the opening 52 and function to stop or prevent the continuing downward travel of the lever 36 as it is being driven downwardly by the means 40 for driving the lever 36 downwardly towards the base 14. A press stop 54 is of the type whose height can be adjusted by screwing the press stop either clockwise or counterclockwise. For example, clockwise rotation can shorten the height of press stop 54 while counterclockwise rotation can lengthen the height of the press stop 54.

Figure 3:
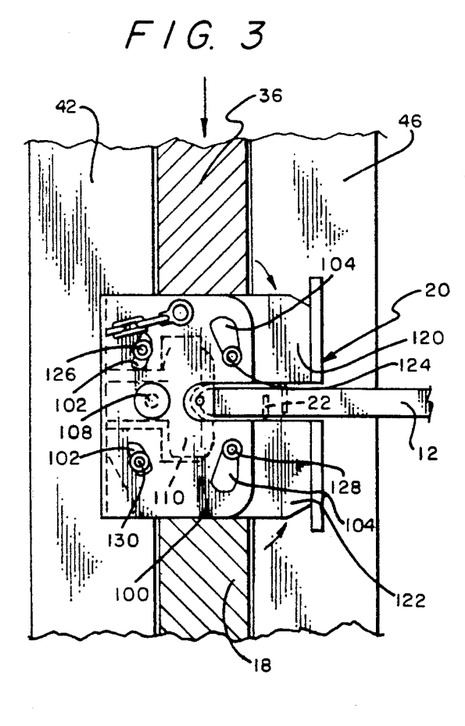
FIG. 3 is a partial vertical sectional view of the apparatus in a closed position having driven downwardly a pair of jaws of a lacer vise means in order to embed the clipper hooks within a belt.

The frame means 34 additionally comprises a pair of lever support members 56—56 connected to the first and second frame structures 42 and 46 across the opening 52 to straddle the same. A pair of spring connector members 58—58 is also connected to the first and second frame structures 42 and 46 across the opening 52 to straddle the same. Connector members 58—58 (as best illustrated in FIG. 3) are above the lever support members 56—56; and the pair of spring means 38—38 connects to the connector members 58—58 and is coupled further to opposed ends of the lever 36 for biasing the latter upwardly against the pair of lever support members 56—56. When the means 40 for drawing the lever 36 is activated, the lever 36 leaves its biased position against the support members 56—56 and is driven downwardly while the pair of spring means 38—38 is being stretched, until the bottom of the lever 36 comes in contact with the pair of press stops 54—54. On the way down, the lever 36 contacts the clipper vise lever means 20 such that the same can release its contained clipper hook 22 into the end of the belt 12.

The means 40 for driving the lever 36 downwardly is preferably a manually operated hydraulic jack means 68 having a handle 60 pivotally coupled to a plunger 62 and a linkage 64. When handle 60 is manually driven downwardly a piston 66 (see FIG. 17) commences to be driven away from the main body of the hydraulic jack 68 and contacts a buttress member 70 that has been previously secured to the first and second frame structures 42 and 46 underneath the respective tops 44 and 48 thereof. The buttress member 70 provides an immovable barrier whereagainst the top of piston 66 urgedly contacts such that as the length of piston 66 extends, the lever 36 travels downwardly proportionately (see FIG. 4).

Figure 16:
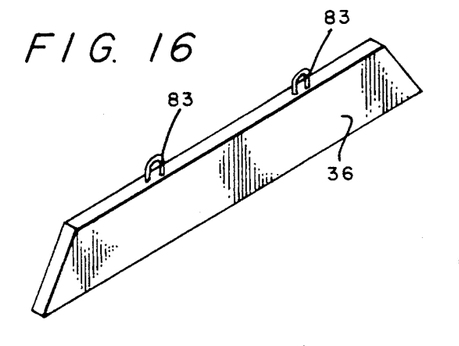
FIG. 16 is a perspective view of the lever including a pair of hooks on the top thereof.
Figure 17:
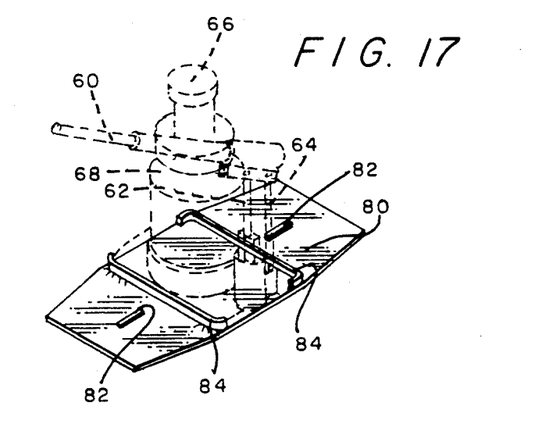
FIG. 17 is a perspective view of the support plate with the hydraulic jack means secured thereto and represented as dotted or broken lines.
Figure 18:
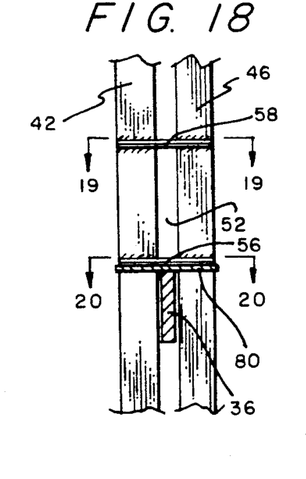
Figures 19, 20:
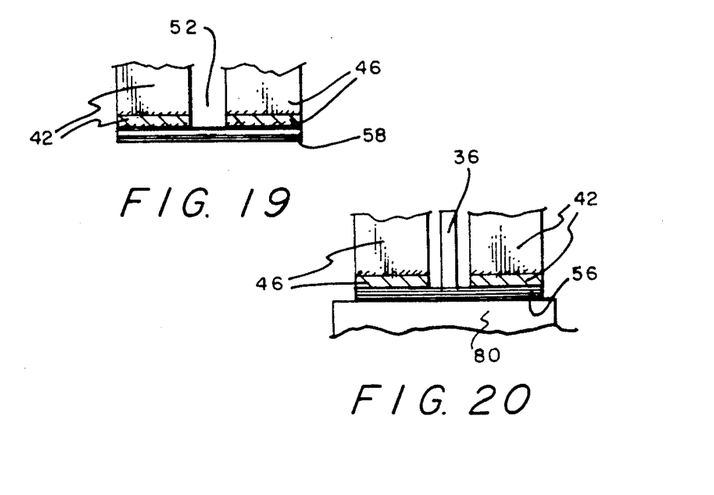
FIG. 19 is a vertical sectional view taken in direction of the arrows and along the plane of line 19—19 in FIG. 18.
FIG. 20 is a vertical sectional view taken in direction of the arrows and along the plane of line 20—20 in FIG. 18.
Figures 21, 22, 23, 24:
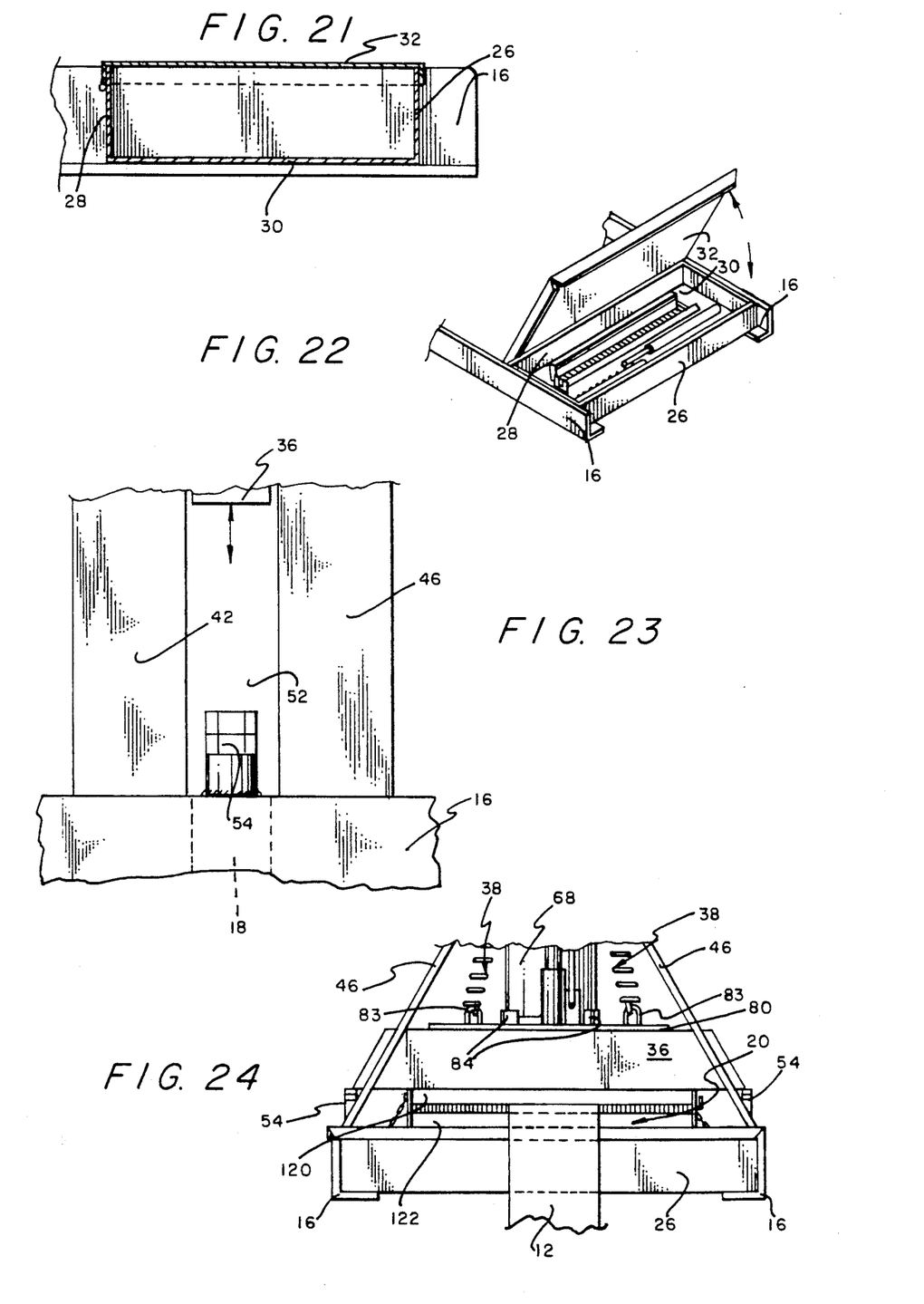
Figure 25:
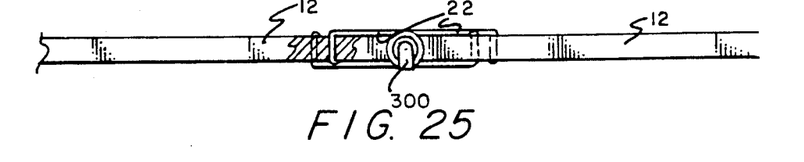
FIG. 25 is a partial vertical sectional view disclosing two ends of a belt laced together.

A support plate 80 is secured to the top of the lever 36 to function as a base support for the means 40 of the hydraulic jack 68. As best illustrated in FIG. 17, the support plate 80 has a pair of opposed apertures 82 wherethrough a pair of hooks 83—83 extend after being implanted into the lever 36 (see FIG. 16). The hooks 83—83 provide a lug means for coupling the pair of spring means 38—38 to the lever 36. Stated alternatively, the spring means 38—38, in addition to connecting to connector members 58—58, secure to the hooks 83—83 for biasing the lever 36 within the opening 52 away from the base 14; more specifically, away from the base support member 18 that is aligned directly underneath the lever 36. A pair of generally parallel rib members 84—84 connect transversely to and across the support plate 80, as best shown in FIG. 17. The hydraulic jack means 68 is secured to the support plate 80 between the rib members 84—84.

The clipper vise lacer means 20 is a conventional clipper vise lacer and no invention is claimed therein. As best illustrated in FIGS. 6-14, the clipper vise lacer means 20 comprises a pair of vise side plates 100—100 with each comprising a pair of rear apertures 102—102 and a pair of front apertures 104—104 and a slot 106. Bound to each side plate 100 via a bolt 108 is a clipper retainer 110 comprising a plurality of slots 112 (see FIG. 14) defining a plurality of partitions 113 with each having an aperture 115. The apex-ends of the clipper hooks 22 lodge within slots 112 and are retained therein by rod 114 passing through the apertures 115 of each partition 113. Typically, the plurality of hooks 22 come with a removable paper shield 200 to protect the user from the sharp hooks 22. This paper shield 200 is obviously removed before a belt 12 is inserted between the sharp ends of the hooks 22.

The clipper vise lacer means 20 additionally comprises an upper jaw 120 and a lower jaw 122. The upper jaw 120 has a front upper lug 124 and a rear upper lug 126 which respectively lodge pivotally in the upper of the apertures 104 and 102 in the side plate 100. Similarly, the lower jaw 122 has a front lower lug 128 and a rear lower lug 130 which respectively lodge pivotally in the lower of the apertures 104 and 102 in the side plate 100. When the upper and lower jaws 120 and 122 are pivotally driven towards each other by being compressed from the downwardly moving lever 36 and the stationary base support member 18 as best illustrated in FIG. 3, the jaws 120 and 122 bend and drive the hooks into an end of the belt 12. When both ends of the belt 12 have embedded hooks 22, a retainer rod 300 passes through the eyelets of the bent hooks 22 (see FIGS. 25 and 26) for securing together the ends of the belt 12.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An apparatus for lacing ends of a belt and the like comprising:
    (a) a base means for supporting the apparatus for lacing in an upright position;
    (b) a first frame structure and a second frame structure, said first and second frame structure each having a top whereat the first and second frame structure connect together to slope down and away from each other such as to provide a generally upright opening and to attach to the base means at a lower extremity of both the first and second frame structure;
    (c) a lever means slidably disposed in said upright opening for moving up and down therein;
    (d) at least one spring means for biasing the lever means upwardly;
    (e) at least one lever support means secured to said first and second frame structure for providing a barrier whereagainst the lever means is lodged by the spring means; and
    (f) a means for driving the lever means downwardly towards the base means to contact and close a clipper vise lacer means containing a plurality of clipper hooks such that the clipper hooks are driven and embedded into an end of a belt that has been previously disposed in the clipper vise lacer means.

2. The apparatus of claim 1 wherein said base means comprises a vise support member that is positioned underneath said lever means and is aligned with said upright opening.

3. The apparatus of claim 2 wherein said base means additionally comprises a press stop means for stopping the downward travel of the lever means when the same is driven downwardly by the means for driving the lever means.

4. The apparatus of claim 1 additionally comprising at least one connector member straddling the upright opening between said first and second frame structure and secured to said first and second frame structure, said at least one spring means is secured to said connector member and to said lever means.

5. The apparatus of claim 1 additionally comprising a support plate means for supporting said means for driving the lever means downwardly, said support plate means connected to said lever means and having a structure defining at least one aperture wherethrough said at least one spring means is coupled to said lever means.

6. The apparatus of claim 5 additionally comprising a pair of generally parallel rib member positioned transversely across said support plate means and secured thereto.

7. The apparatus of claim 6 wherein said means for driving is secured to said support plate means between said pair of generally parallel rib members.

8. The apparatus of claim 1 additionally comprising a buttress member means secured to the tops of the first and second frame structure for providing a buttress surface whereagainst the means for driving the lever means can be biased by the spring means.

9. The apparatus of claim 1 wherein said base means comprises a container means for storing articles.

10. The apparatus of claim 1 wherein said means for driving comprises a manual hydraulic means having a handle means which when pushed downwardly causes the manual hydraulic means to drive the lever means downwardly.

11. The apparatus of claim 5 additionally comprising at least one hook member secured to said lever means and passing through said aperture of said support plate means.

* * * * *